United States Patent [19]

Yang

[11] 4,411,506

[45] Oct. 25, 1983

[54] PHOTOGRAPHIC CAMERA

[75] Inventor: Lian T. Yang, Singapore, Singapore

[73] Assignee: Hallmark Camera Mfg. Pte. Ltd., Singapore, Singapore

[21] Appl. No.: 322,702

[22] Filed: Nov. 18, 1981

[30] Foreign Application Priority Data

Nov. 20, 1980 [GB] United Kingdom ............... 8037337

[51] Int. Cl.³ ...................... G03B 1/12; G03B 15/05
[52] U.S. Cl. ................................... 354/145; 354/173
[58] Field of Search ............... 354/145, 173, 204, 206

[56] References Cited

U.S. PATENT DOCUMENTS

| | | | |
|---|---|---|---|
| 3,481,261 | 12/1969 | Fischer et al. | 354/204 X |
| 3,882,515 | 5/1975 | Mueller | 354/173 |
| 4,141,635 | 2/1979 | Asano et al. | |
| 4,201,460 | 5/1980 | Stemme et al. | |
| 4,273,432 | 6/1981 | Matsuda et al. | 354/145 |

FOREIGN PATENT DOCUMENTS

2841606 8/1979 Fed. Rep. of Germany .
2030713 4/1980 United Kingdom .

*Primary Examiner*—John Gonzales
*Attorney, Agent, or Firm*—Watson, Cole, Grindle & Watson

[57] ABSTRACT

In a still camera of the 110-format cassette type, an electric motor is provided for winding on the film and thereby priming the shutter by means of a mechanism which engages a perforation in the film as it passes and moves a shutter priming member. A switch then disconnects power to the electric motor and the camera is ready to expose the next frame of film. In the event that the camera is operated without a film cassette inserted, a trigger mechanism is provided which directly primes the shutter via a gearing mechanism from the motor. When a film cassette is inserted in the camera, the trigger mechanism is inhibited and the shutter is primed only by the passing of a film perforation. Such an arrangement provides a very compact camera and allows the inclusion of an electronic flash unit, if desired.

19 Claims, 13 Drawing Figures

PHOTOGRAPHIC CAMERA

The present invention relates to a still photographic camera, in particular to such a camera for use with a type of film having perforations which identify the individual exposure frames, and specifically wherein the film is contained in a cassette provided with two compartments, the film being arranged to be wound from one compartment to the other across a light transmissive area for exposure of the film.

In one known arrangement of such a camera, an electric motor is provided for winding on the film and for priming the shutter mechanism, the motor being responsive to a device for detecting the perforations in the film so as to stop the film when a new unexposed frame is correctly positioned. However, in this known arrangement, in particular when constructed for use with the so-called 110 film cassette, the camera needs to be relatively large so as to incorporate a complex system of mechanical elements such as levers and interlock devices, since the amount of motor rotation required for winding on the film will vary as the quantity of film wound on to the spool increases, while that required for priming the shutter will remain constant. Furthermore, a further function needs to be provided so as to stop the motor after sufficient rotation to prime the shutter should the camera be operated without a film cassette inserted, for example for test or demonstration purposes; otherwise the motor would remain activated for an indefinite period since the detecting device would not register a film perforation.

Whereas it is advantageous to provide a "built-in" electronic flash unit in such cameras, the extra space required has meant that cameras provided with both motor drive and electronic flash would be inconveniently large.

It is therefore an object of the present invention to provide a sufficiently compact motor driven camera mechanism so that the dimensions of the camera body can be minimised, and preferably so that an electronic flash unit can be incorporated in the camera body.

From a first aspect, the present invention provides a camera for use with a film cassette of the above-described kind, the camera comprising a shutter, an electric motor arranged to wind on film contained in the film cassette when inserted in the camera, a shutter priming mechanism responsive to the passing of a perforation during wind on of the film to prime the shutter, switch means responsive to the shutter priming mechanism being primed to disconnect power to the electric motor, and a trigger means responsive to the absence of a film cassette in the camera to transmit drive from the electric motor to the shutter priming mechanism so as to prime the mechanism.

From a second aspect, the present invention provides a camera comprising a shutter, an electric motor arranged to wind on film when inserted in the camera, a shutter priming mechanism for priming the shutter, switch means responsive to the shutter priming mechanism being primed to disconnect power to the electric motor, a shutter release member arranged upon depression thereof to activate the primed shutter, and a further switch means arranged to break the electrical path to the motor upon depression of the shutter release member, whereby wind on of film by the motor after activation of the shutter is inhibited until release of the shutter release member.

From a third aspect, the present invention provides a camera for use with a film cassette of the above-described kind, the camera comprising a shutter, an electric motor arranged to wind on film contained in the film cassette when inserted in the camera, a control lever pivoted in the vicinity of its centre and extending substantially along a major dimension of the camera, and a shutter priming mechanism arranged to latch or be latched by the control lever, the control lever latching the shutter priming mechanism when in a primed state, and the shutter priming mechanism latching the control lever when in an unprimed state, whereby the control lever pivots in response to depression of a shutter release member from the primed to the unprimed state, and returns to the primed state under resilient bias when the shutter priming mechanism is primed, the control lever being disposed so as to close a switch in a power supply circuit to the motor when in the unprimed state.

From a fourth aspect, the present invention provides a camera including a shutter, an electric motor arranged to wind on film when inserted in the camera, a shutter priming mechanism for priming the shutter, an electronic flash unit, a power supply, and switch means responsive to the shutter priming mechanism selectively to connect the power supply to the flash unit when the shutter is primed, and to the electric motor when the shutter is not primed.

In order that the present invention may be more readily understood, an embodiment thereof will now be described, by way of example, with reference to the accompanying drawings in which.

Figure 1:
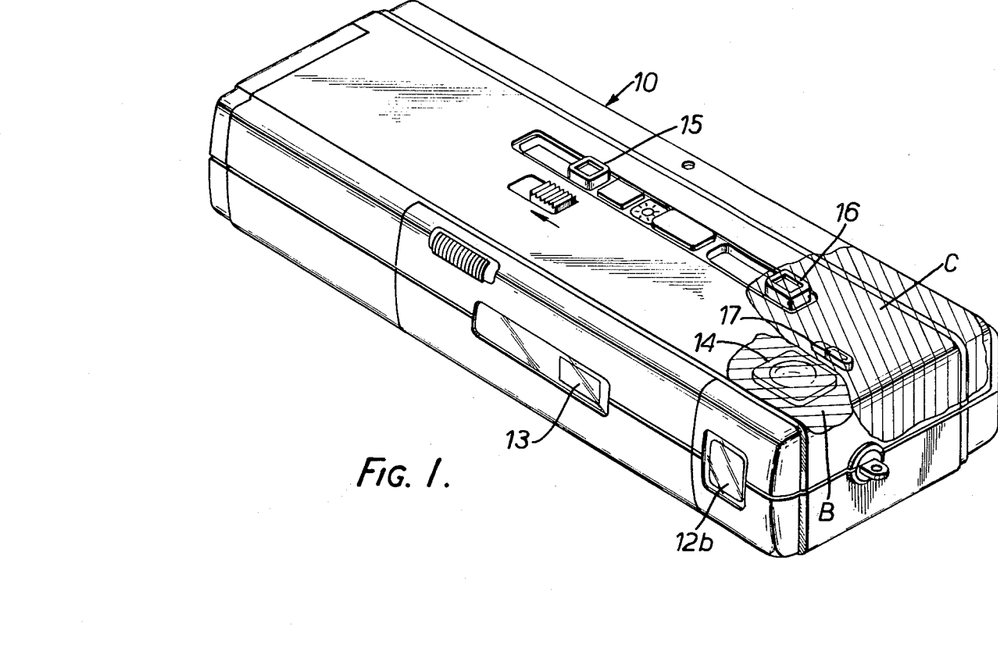
FIGS. 1 and 2 show respectively top and bottom perspective views of a camera body suitable for housing the preferred mechanisms of the present invention.
Figure 2:
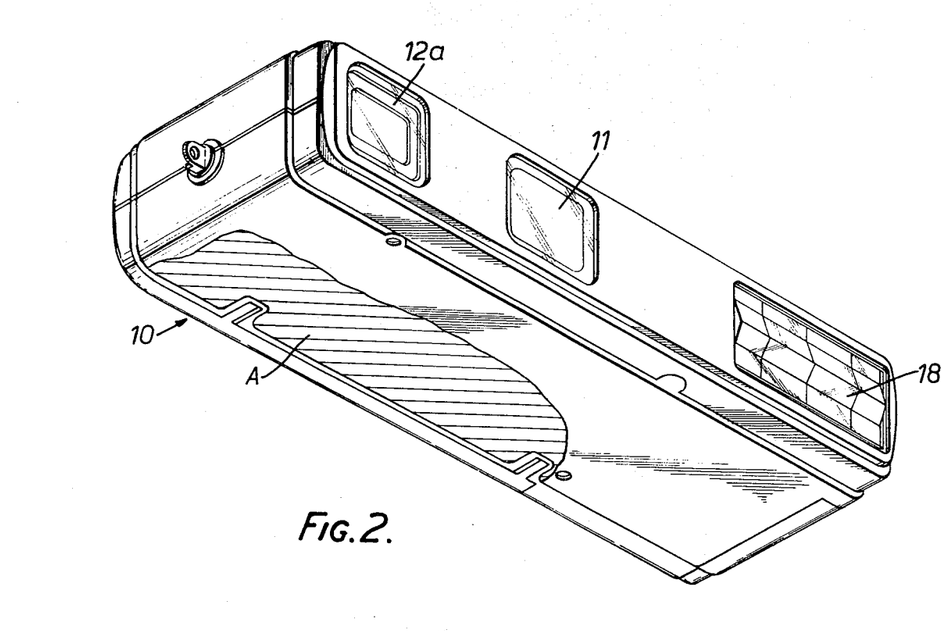

Referring to FIGS. 1 and 2, there are shown top and bottom views of a camera body 10 suitable for housing the preferred arrangements to be described. As is conventional, the camera body includes a lens 11, image and viewing windows 12a, 12b of a viewfinder, a film frame number indicator window 13, and a shutter release button 14. Also provided are various control members 15, 16, 17 for activating a flash unit 18, for selecting normal or telephoto lens and for locking the shutter release mechanism. Areas 'A', 'B' and 'C' refer to parts of the camera which are detailed in cut-away views in further Figures of the drawings.

Figure 3:
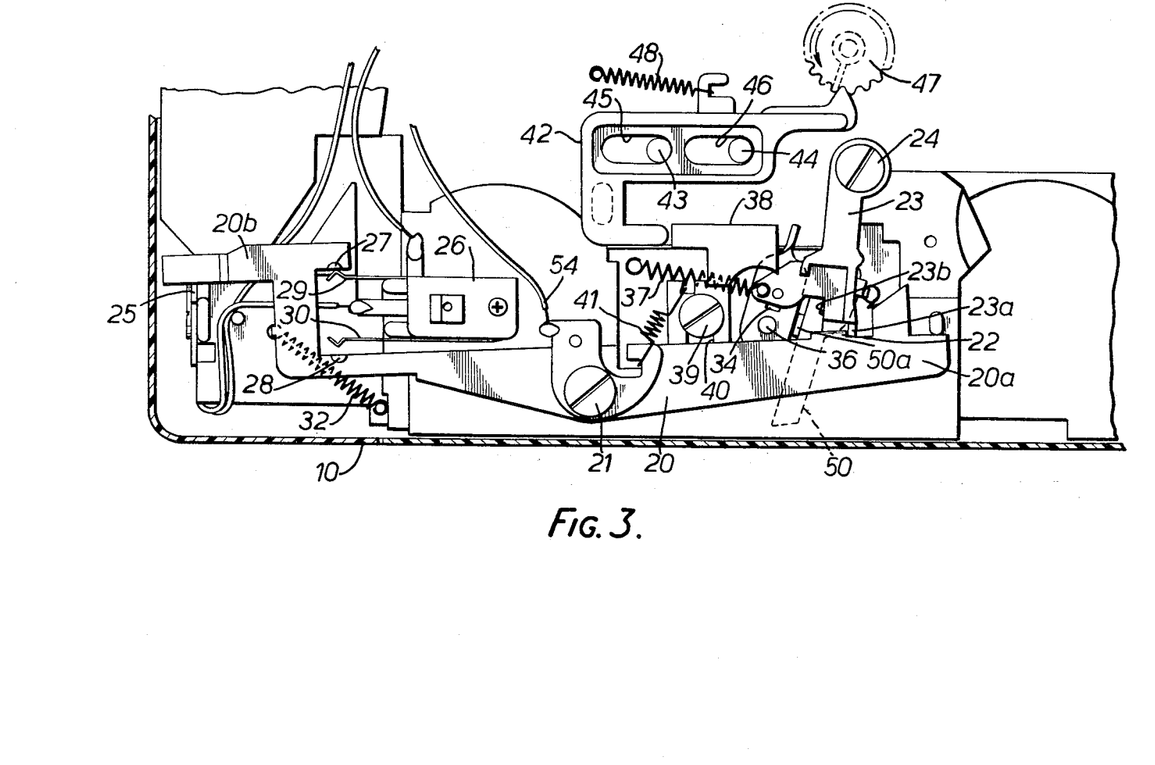
FIG. 3 shows a cut-away view of the camera body of FIGS. 1 and 2 including a preferred operating mechanism in a primed shutter position.
Figure 4:
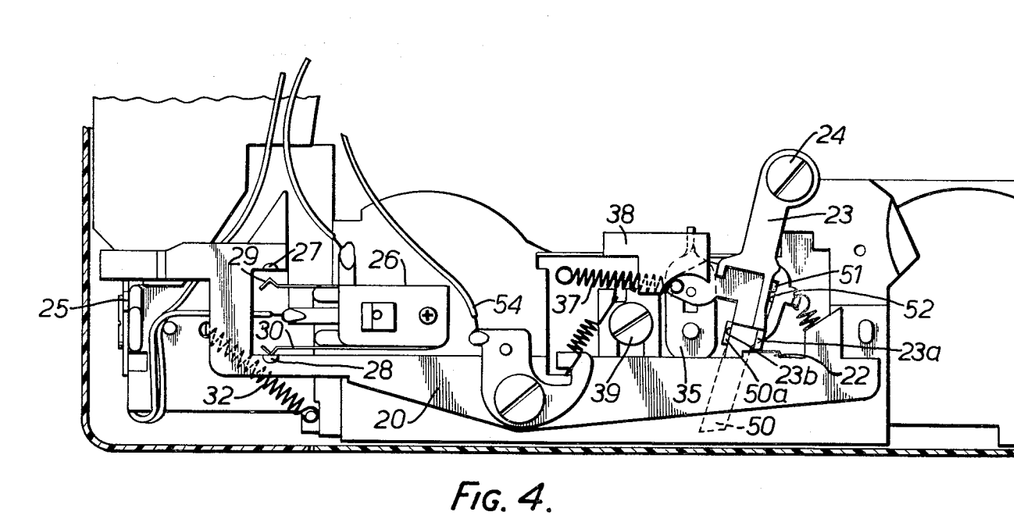
FIG. 4 shows the view of FIG. 3 but with the mechanism in an unprimed position shortly after shutter activation.
Figure 5:
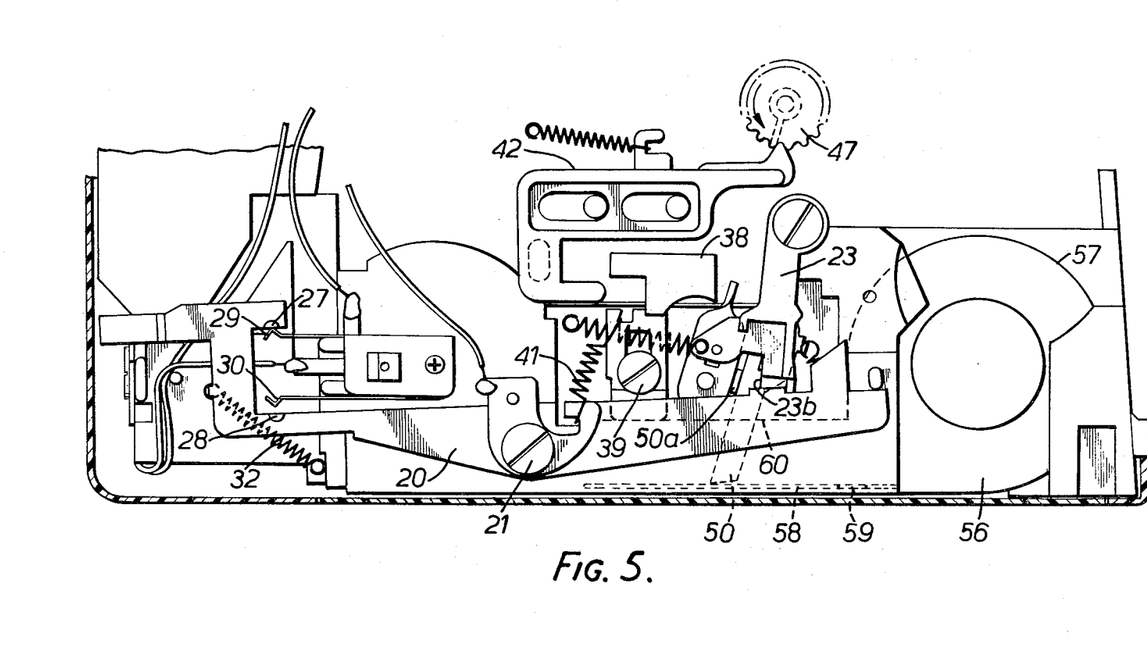
FIG. 5 shows a view similar to FIG. 3 but incorporating a film cassette.

FIGS. 3, 4 and 5 are cut-away views of area 'A' of the camera (as shown in FIG. 2) in various modes of operation. Referring initially to FIG. 3, the body or housing 10 includes a shutter control arm 20, pivoted about a point 21, and including a shutter trigger release end 20a, and a shutter release lever responsive end 20b. The end 20a includes a downwardly turning projection 22 for engaging a portion 23a of a priming trigger mechanism 23 pivoted about a point 24. The end 20b is arranged to be movable in response to movement of the shutter release button via a release lever 25. The end 20b is also arranged to operate a motor control switch 26 in a manner described hereinafter by portions 27, 28 of the control arm 20 selectively bearing on contacts 29, 30 respectively of the switch 26. The control arm 20 is normally biased in the position shown in FIG. 3 by a spring 32.

The priming trigger mechanism 23 is attached, via a peg and aperture arrangement 34, to a shutter operating lever 35 pivotable about a point 36. The shutter operating lever 35 effectively biased in an anticlockwise sense by a spring 37 acting on the mechanism 23, operates the shutter (not shown) when released in an anticlockwise sense and primes the shutter when induced in a clockwise sense to the position shown in FIG. 3.

A cocking hammer member 38 is disposed for both pivotal movement about a point 39 and also for translational movement at right angles to the axis of the control arm 20 as enabled by an elongate aperture 40 in the member 38. The cocking hammer member 38 is normally retained in the position shown in FIG. 3 by a biasing spring 41. A trigger 42 is disposed, by means of pegs 43, 44 engaging apertures 45, 46 therein, to transmit movement from an anticlockwise rotating ratchet gear 47 to the cocking hammer member 38 against a spring 48.

A perforation detecting member 50 is disposed in the path of the film (as hereinafter described) and is provided with limited degrees of freedom along its axial direction and rotational movement about a point 51 (shown on FIG. 4) at which a peg is provided fitting in an elongate aperture 52 in the detecting member 50. The member 50 is also provided with an upturned portion 50a for engaging a part 23b of the priming trigger mechanism 23.

Although not shown on the part of the camera illustrated in FIGS. 3, 4 and 5, there is further provided an electric motor arranged to drive a gear train, of which ratchet gear 47 forms part, a final gear being engageable with the gear teeth provided on the winding-on spool of a film cassette.

As shown in FIG. 3, the mechanism is in a primed state, and depression of the shutter release button (not shown therein) will activate the shutter and leave the mechanism in the state shown in FIG. 4. When the shutter release button is depressed, the release lever 25 connected thereto bears on the control arm 20 at end 20b and causes it to rotate anticlockwise about pivot point 21 against the spring 32. One effect of this movement of the control arm 20 is that the projection 22 thereon no longer restrains the priming trigger mechanism 23 which, under the influence of spring 37 moves rapidly to the position of FIG. 4; in so doing, it causes the shutter operating lever 35 to activate the shutter. Upon completion of this operation, the control arm 20 is prevented from returning to its original position (as shown in FIG. 3) by the portion 23a now abutting the projection 22.

Another effect of movement of the control arm 20 is that connection between contacts 27 and 29 of the switch 26 is broken and made between contacts 28 and 30. In the illustrated arrangement, the control arm 20 is conductive and itself acts as a contact of the switch, connection thereto being made by wire 54. The contacts 28 and 30 constitute a switch in the circuit between batteries and motor as described hereinafter, and once this switch and a further switch (referred to later) are closed the motor will operate and the priming trigger mechanism 23 will be returned to its primed (FIG. 3) position in either of two ways.

For the first way in which the mechanism 23 is primed, refer to FIG. 5 which shows the arrangement primed with a film cassette 56 inserted. Under these circumstances, the winding-on spool 57 of the cassette 56 is engaged with the gear train (not shown) for motor wind-on; the detecting member 50 bears against the film 58 until a perforation 59 is detected; and the cocking hammer member 38 is pushed outwardly by the intermediate web casing 60 of the cassette 56 against the bias provided by the spring 41.

When the motor is energised, the gear train will drive the engaged gear (not shown) on the spool 57 to wind on the film. As the next perforation 59 reaches the detecting member 50 (denoting the next exposure frame), the member 50 is urged into the perforation and rotated in an anticlockwise sense by further movement of the film. During this rotation, the upturned portion 50a engages the part 23b of the priming trigger mechanism 23 and causes rotation thereof until the mechanism 23 is clear of the downturned portion 22 of the control arm 20, upon which the control arm 20 rotates clockwise under the effect of spring 32 and attains its FIG. 3 position. The connection between contacts 28 and 30 is broken by this movement and the motor is de-energised. Film wind-on ceases and the detecting member 50 returns to its former position, bearing against film 58. The priming trigger mechanism 23 however remains in its primed position by virtue of being restrained by portion 22 of the control arm 20. It may be seen that the mechanism has now reverted to its FIG. 3 position and the shutter release button may be activated again. Insertion of the film cassette causes displacement of the cocking hammer member 38 so that activation of trigger 42 by the ratchet gear 47 has no effect on the remainder of the mechanism.

For the second way in which the mechanism 23 is primed, consider that no film cassette has been inserted into the camera, which situation is shown in FIGS. 3 and 4. The above-described priming and motor switch-off function cannot occur as no perforations will be detected, and therefore if the shutter release button were to be depressed for test or demonstration purposes, the motor would continue running indefinitely in the absence of further means. Such means are provided by the ratchet gear 47 and the trigger 42. As stated above, the ratchet gear 47 forms part of the gear train between the motor and the final gear wheel arranged to engage the winding-on spool of the film cassette. The gear 47 therefore rotates with the motor and, after completing one rotation, moves the trigger 42 against its spring bias to contact the cocking hammer member 38 causing the latter to rotate about point 39 and re-prime the priming trigger mechanism 23 from its position in FIG. 4 to that of FIG. 3. (The trigger 42 and ratchet gear 47 have not been included in FIG. 4 for the sake of simplicity). Once again, when the mechanism 23 takes up its primed position, the control arm 20 can rotate anticlockwise and stop the motor by breaking contacts 28, 30; the camera is then ready for further depression of the shutter release button.

It will therefore be seen that the trigger 42 and cocking hammer member 38 act to simulate detection of a film perforation and cause priming of the shutter and stopping of the motor in the absence of an inserted film cassette. This operation is typically completed within 0.75 sec. of activation of the motor. Once a cassette is inserted, the cocking hammer member 38 is held away from the trigger 42 (FIG. 5), and these components then play no part in priming the shutter or stopping the motor.

Figure 6:
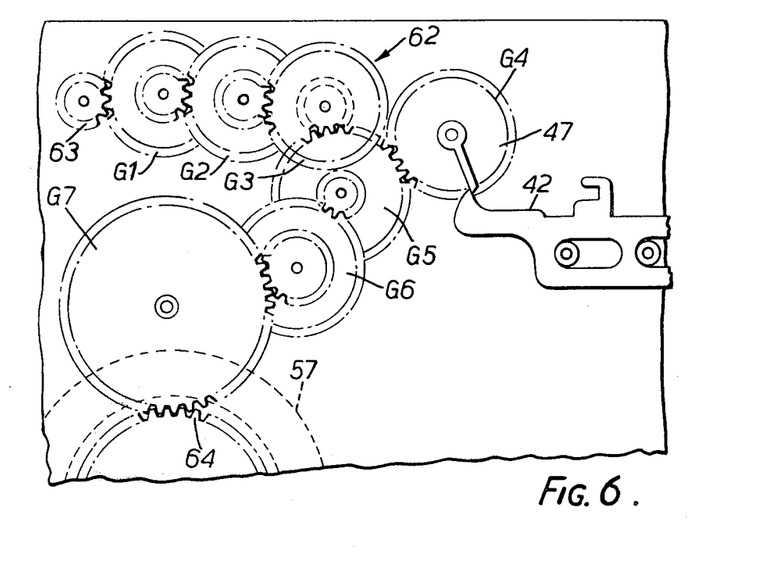
FIG. 6 shows a gear train suitable for use with the mechanisms of FIGS. 3 to 5.

FIG. 6 shows the preferred gear train arrangement 62 which includes concentric gear wheels of large and small diameter G1 to G6 (G4 being the ratchet gear 47 for operating trigger 42), and a single gear wheel G7 arranged to engage the toothed wheel 64 on the winding-on spool 57 of the film cassette. A pinion gear 63 is engaged with gear G1 for driving the gear train, the pinion gear 63 being provided on the shaft of the electric motor. The gear train can conveniently be provided directly on the underside of the camera body in the vicinity of area 'A' shown in FIG. 2. (As FIG. 6 is a view of the gears as mounted on the body, the trigger 42 is shown in an opposite sense to that on FIGS. 3 and 5 which are effectively views with the camera body removed).

Figure 7:
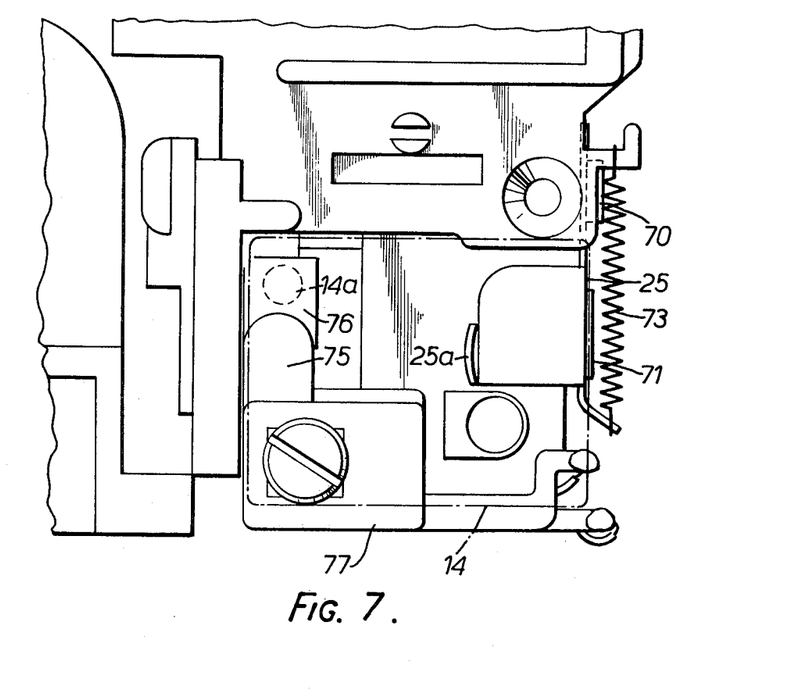
FIGS. 7 and 8 show respectively top and side views of the shutter release button and associated mechanisms.
Figure 8:
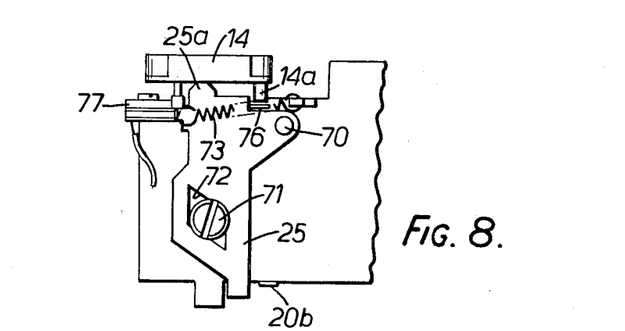

FIGS. 7 and 8 respectively show top and side views (not to the same scale) of the shutter release button 14 and release lever 25 as shown at 'B' on FIG. 1. The shutter release button 14 when depressed bears against an upturned portion 25a of the release lever 25 which, being pivoted about a point 70 and restrained by limit positions provided by a screw 71 within a shaped aperture 72, pivots in an anticlockwise direction against a spring 73 to engage end 20b of the control arm 20 and release the shutter if primed as previously described. However, the shutter release button 14 also includes a downwardly directed projection 14a arranged, upon depression of the button, to open the contacts 75, 76 of a microswitch 77. The microswitch 77 is included in the motor control circuit and its purpose will be further discussed with reference to FIG. 9.

Figures 9, 13:
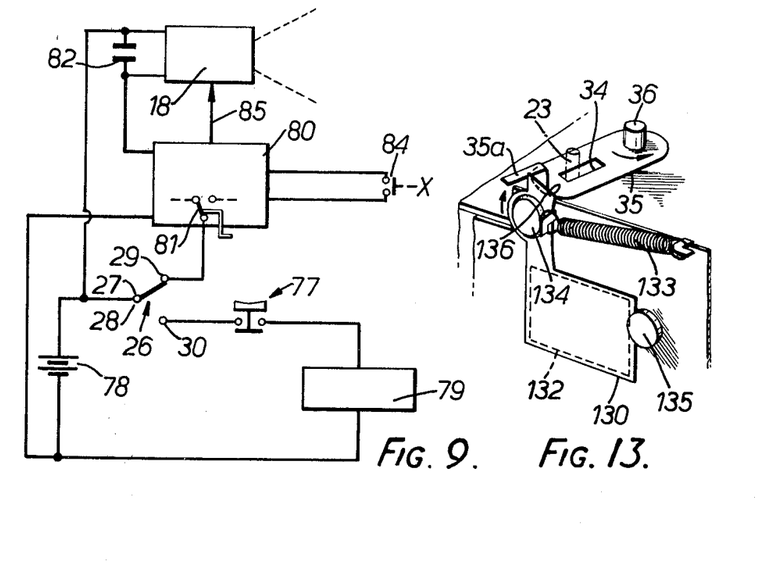
FIG. 9 shows a circuit diagram of the preferred camera mechanism.
FIG. 13 shows a partial perspective view of the camera shutter.

FIG. 9 shows the circuit diagram of the described arrangement. One or more batteries 78 are connected to the electric motor 79 via two switches in series 26 and 77. The switch 26 comprises the arrangement shown in FIGS. 3 to 5 and the switch 77 comprises the microswitch positioned under the shutter release button 14. Referring initially only to this motor control part of the circuit, consider that the shutter is primed and that accordingly the switches are in the illustrated states. When the shutter release button is depressed, the microswitch 77 is opened. However, depression of the shutter release button will cause movement of the control arm 20 and closing of the contacts 28, 30 as previously described. The motor 79 will not be activated until the shutter release button has been released and the microswitch 77 allowed to close, thereby completing the motor circuit. As soon as film wind-on has been fully achieved as previously described, the switch 26 will return to its illustrated position and the motor will stop.

It will be seen that the described circuit provides the advantageous feature of preventing unintentional multiple exposures due to prolonged depression of the button, since the motor will not wind on after an exposure until the button has been released.

The circuit of FIG. 9 also includes elements for use with a built-in electronic flash. A flash printed circuit board (PCB) 80 is provided with battery power whenever the switch 26 is not in its "motor on" position. The PCB includes a further switch 81 responsive to the control member 15 (FIG. 1) when flash is selected. An output of the PCB 80 provides a relatively high voltage from a rectified converter section to a capacitor 82 which is connected to the flash tube 18. An 'X' contact 84 provided on the shutter and arranged to close when the shutter is fully open causes the PCB 80 to provide a trigger signal to the flash tube 18 along a line 85.

It may be seen that the circuit only provides power to one of the motor drive or flash circuits at any one time; therefore adverse interreaction is avoided and full power is available from the batteries for the specific function required at the time.

Figure 10:
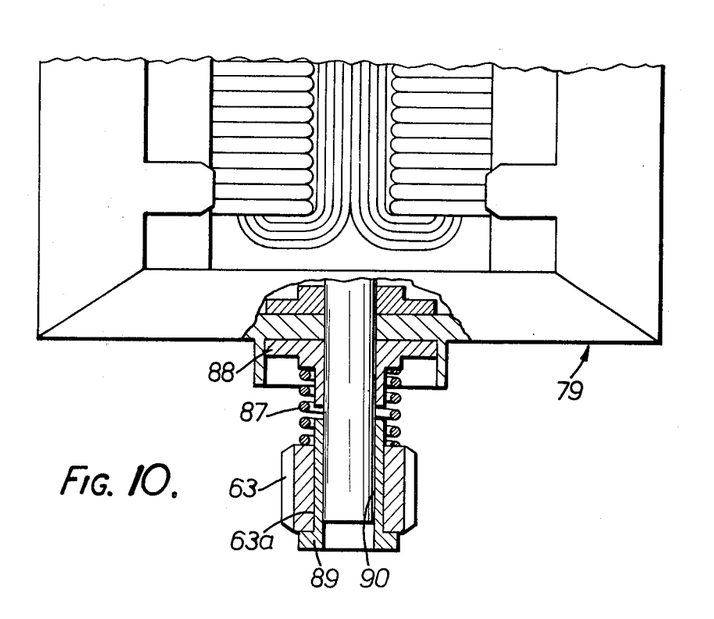
FIG. 10 shows a partial cross-section view of a preferred arrangement between gear pinion and electric motor.

FIG. 10 shows a preferred arrangement of gear pinion 63 on the electric motor 79. A compression spring 87 is positioned between a washer 88 and the pinion 63 which is clearance fitted 63a on to a flange 89. The flange 89 is force fitted on to the spindle 90 of the motor. The function of the spring 87 is to provide a positive tension for the pinion 63 to drive the gear train mechanism. Should there be a malfunction, such as a varying load, in the gear train mechanism, the electric motor would not be unduly stressed because the clearance between the pinion 63 and the flange 89 would provide a "slipping clutch" effect.

Figure 11:
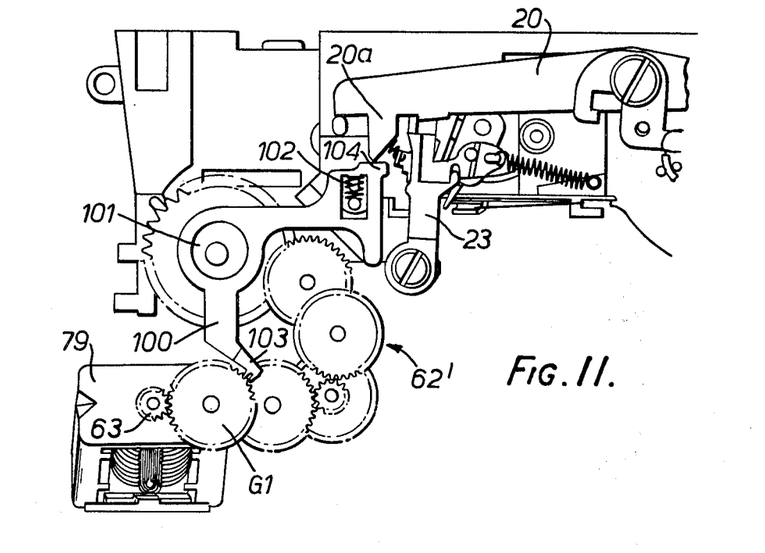
FIGS. 11 and 12 show views similar to those of FIGS. 3, 4 and 5 but including an improved gear braking arrangement.
Figure 12:
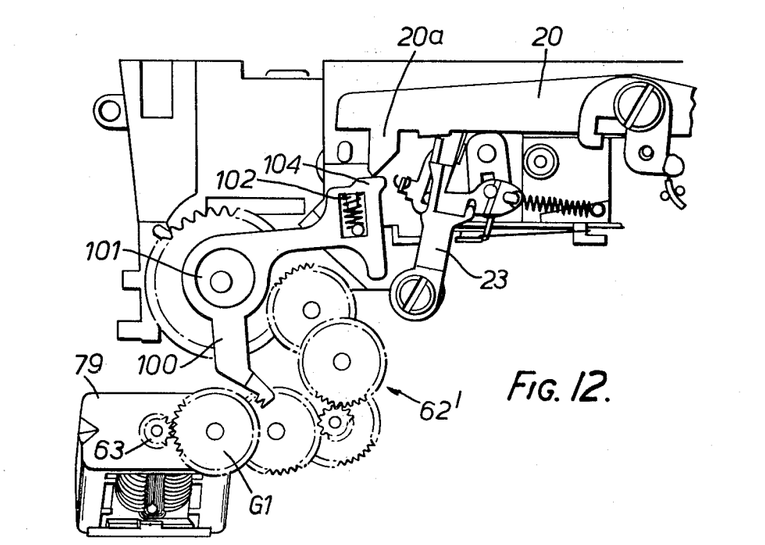

FIGS. 11 and 12 show a modification to the basic camera mechanism which provides improved braking of the gear train and hence more positive location of each frame of the film following wind-on. The basic camera mechanism is identical to that previously described but with the addition of the following extra components. A brake member 100 is positioned on an eccentric pivot pin 101. The pivot pin can conveniently also act as a pivot for one of the gears in gear train 62'. A compression spring 102 is positioned between a fixed pin on the camera body and a part of the brake member, conveniently within a frame portion of the member as shown, so as to bias the brake member in an anticlockwise sense. The brake member 100 includes one end 103 having a notched surface arranged to engage the teeth on gear G1 of gear train 62' which is driven by the gear pinion 63 of the electic motor 79 (shown schematically in partial perspective). Another end 104 of the brake member 100 is disposed so as to abut the shutter trigger release end 20a of the control arm 20 and bias from the spring 102 tends to hold the brake member 100 and end 20a in contact.

FIG. 11 shows control arm 20 in the same position as in FIG. 3, i.e. in the primed state, whereas FIG. 12 shows control arm 20 in the same position as in FIG. 4, i.e. in the unprimed state following release of the shutter.

In FIG. 11, the priming trigger mechanism 23 is latched by the control arm 20 in the primed state and in this position, the brake member 100 is held by control arm end 20a so that its notched end 103 engages the teeth on gear G1 and prevents movement of the gear. When the shutter release button is activated, the control arm 20 pivots clockwise (as previously described), unlatching the priming trigger mechanism 23 which operates the shutter, and attaining the position shown in FIG. 12. As shown in FIG. 12, the brake member 100 is therefore pivoted anticlockwise, under the influence of spring 102, and its notched end 103 is held clear of gear G1. Subsequent activation of the motor 79, as previously described, will allow uninterrupted transfer of drive through the gear train 62' to the film spool and thereby provide wind-on of the film.

As soon as either a film perforation has been detected (FIG. 5) or, if no film cassette is present, the trigger 42 has transmitted drive to the cocking hammer member 38, the priming trigger mechanism 23 is moved back to its FIG. 11 position and the control arm 20 is also pivoted clockwise to the FIG. 11 position. Power to the electric motor 79 is shut off by means of switch 30 and the motor stops, again as previously described. However, in the modified arrangement of FIGS. 11 and 12, the brake member 100 immediately engages its notched end 103 with the gear G1 and thereby provides a very positive termination to the gear train rotation. This counteracts any inertial tendency for the motor and gear train to continue rotation after the motor has been switched off and therefore allows significantly more positive location of individual film frames to be achieved.

FIG. 13 shows a partial perspective view of a shutter mechanism suitable for use with the above-described arrangements, certain parts being omitted from this Figure for the sake of clarity. The shutter operating lever 35 is shown (as in the earlier Figures) pivoted about point 36 and controllable via peg and aperture arrangement 34 by the priming trigger mechanism 23 (of which only the engaging peg is shown in broken outline). A shutter 130 is normally held closed with respect to the camera aperture 132 by a spring 133 biasing the shutter 130 in an anticlockwise sense about a pivot 134 against a stop 135. The shutter operating lever 35 has a projecting end 35a for engaging the top part 136 of shutter 130 in the following manner.

When the shutter release button is depressed, shutter actuation is transmitted via control arm 20 and priming trigger mechanism 23 to the lever 35 which is urged anticlockwise by spring 37 (shown in FIG. 3). The lever end 35a engages the shutter top part 136 against a surface approximately perpendicular to its line of action and therefore urges the shutter open against spring 133. Once the shutter 130 has fully opened, the lever end 35a will have assumed a position to the right of shutter top part 136 which is then returned to its original position by spring 133 which closes the shutter.

At some later time, the priming trigger mechanism 23 returns the lever 35 to its original position, and due to the angled surfaces on shutter top part 136 and lever end 35a, the lever rides over the shutter top part 136 (sufficient resilience being provided to allow this to happen) without affecting the shutter 130 further.

It will therefore be seen that the camera mechanism and its modification as herein described allows a considerable degree of miniaturisation to be achieved, which readily provides sufficient space for an electronic flash unit to be incorporated, if desired, despite the provision of the motor drive unit.

What is claimed is:

1. A camera for use with a film cassette containing film having perforations indicative of film position, the camera comprising a shutter, an electric motor arranged to wind on film contained in the film cassette when inserted in the camera, a power supply for said electric motor, a shutter priming means for priming said shutter, said shutter priming means being responsive to the passing of a perforation during wind on of the film to prime said shutter, switch means responsive to said shutter priming means being in a primed state to disconnect power from said power supply to said electric motor, and a trigger means responsive to the absence of a film cassette in the camera to transmit drive from said electric motor to prime said shutter priming means.

2. A camera as claimed in claim 1, wherein said shutter priming means includes a perforation detecting member for engaging a perforation of the film as the film is wound past by said motor, and a priming member which is urged by movement of said perforation detecting member when engaged in the moving perforation to prime said shutter.

3. A camera as claimed in claim 2, wherein said trigger means includes a trigger member, a hammer member which in the absence of a film cassette in the camera is positioned to move in response to said trigger member driven by said motor to urge said priming member to prime said shutter, and in the presence of a film cassette is positioned out of alignment with movement of said trigger member, whereby said shutter is primed by said motor via said trigger member only when no film cassette is present in the camera.

4. A camera as claimed in claim 3, wherein said hammer member is mounted for pivotal and sliding movement whereby to pivot upon impact by said trigger member in the absence of a film cassette so as to move said priming member, insertion of a film cassette acting to slide said hammer member out of alignment with said trigger member.

5. A camera as claimed in claim 3, wherein said motor drives film contained in the film cassette via a gear train, said gear train including a ratchet gear rotation of which provides an impulse to move said trigger member.

6. A camera as claimed in claim 5, wherein said gear train is driven by a pinion clearance fitted on said electric motor, a tensioning means being provided for said pinion to drive said gear train in the absence of an excessive load.

7. A camera as claimed in claim 5, further comprising braking means responsive to said shutter priming means being set to said primed state so as to apply a braking effect to said gear train when said switch means disconnects power to said electric motor.

8. A camera as claimed in claim 2, further including a control member for latching and being latched by said priming member, said control member latching said priming member when in a primed position and said priming member latching said control member when in an unprimed position, said control member moving in response to actuation of a shutter release member from the primed to the unprimed position and returning to the primed position under resilient bias when said priming member is primed, said control member being disposed so as to close said switch means when in the unprimed position.

9. A camera as claimed in claim 8, wherein said control member is a lever activated by said shutter release member at one end thereof and interacting with said priming member at the other end thereof, said lever being pivoted at a position in between said ends and extending along a major dimension of the camera.

10. A camera as claimed in claim 8, further comprising braking means responsive to said shutter priming means being set to said primed state so as to apply a braking effect to said gear train when said switch means disconnects power to said electric motor.

11. A camera as claimed in claim 10, wherein said braking means comprises a brake member pivoted by said control member to apply a braking effect to said gear train.

12. A camera as claimed in claim 8, wherein said control member acts as one contact of said switch means.

13. A camera as claimed in claim 1, further including a shutter release button arranged upon depression thereof to activate said shutter when primed, and a further switch means arranged to break the electrical path from said power supply to said electric motor upon depression of said shutter release button, whereby wind-on of film by said motor after activation of said shutter is inhibited until release of said shutter release button.

14. A camera as claimed in claim 1, further including an electronic flash unit, said first-mentioned switch means being responsive to said shutter priming means selectively to connect power to said flash unit when said shutter is primed, and to said electric motor when said shutter is not primed.

15. A camera for use with a film cassette containing film having perforations indicative of film position, the camera comprising a shutter, an electric motor arranged to wind on film contained in the film cassette when inserted in the camera, a power supply for said electric motor, a shutter priming means for priming said shutter, switch means responsive to said shutter priming means being in a primed state to disconnect power from said power supply to said electric motor, a shutter release means for activating the primed shutter upon manual depression thereof, and a further switch means associated with said shutter release means to break the electric path to said electrical motor upon depression of said shutter release means, whereby wind on of film by said motor after activation of said shutter is delayed until after release of said shutter release means, said shutter priming means including a perforation detecting member for engaging a perforation of the film as the film is wound past by said motor, and a priming member which is urged by movement of said perforation detecting member when engaged in the moving perforation to prime said shutter.

16. A camera as claimed in claim 15, further including a control member for latching and being latched by said priming member, said control member latching said priming member when in a primed position and said priming member latching said control member when in an unprimed position, said control member moving in response to actuation of said shutter release means and returning to the primed position in response to a bias means when said priming member is primed, said control member being disposed so as to close said first-mentioned switch means when in the unprimed position.

17. A camera for use with a film cassette containing film having perforations indicative of film position, the camera comprising a shutter, an electric motor arranged to wind on film contained in the film cassette when inserted in the camera, a power supply for said electric motor, a control lever pivoted between its ends and extending along a major dimension of the camera, and a shutter priming means arranged to latch or be latched by said control lever, said control lever latching said shutter priming means when in a primed state, and said shutter priming means latching said control lever when in an unprimed state, said control lever pivoting in response to depression of a shutter release member from the primed to the unprimed state, and returning to the primed state under resilient bias when said shutter priming mechanism is primed, said control lever being disposed so as to close a switch between said power supply and said motor when in the unprimed state.

18. A camera as claimed in claim 17, wherein said control lever acts as one contact of said switch.

19. A camera as claimed in claim 18, further including an electronic flash unit, said control lever acting to connect power selectively to said flash unit when said shutter is primed, and to said electric motor when said shutter is not primed.

* * * * *